(12) United States Patent
Livingston

(10) Patent No.: US 6,172,758 B1
(45) Date of Patent: Jan. 9, 2001

(54) MULTIPLE UNIT ALIGNMENT SYSTEM

(75) Inventor: Peter M. Livingston, Palos Verdes Estates, CA (US)

(73) Assignee: TRW Inc., Redondo Beach, CA (US)

( * ) Notice: Under 35 U.S.C. 154(b), the term of this patent shall be extended for 0 days.

(21) Appl. No.: 09/176,040

(22) Filed: Oct. 20, 1998

(51) Int. Cl.[7] .................................................. G01B 11/00
(52) U.S. Cl. .............................................................. 356/399
(58) Field of Search ..................................... 356/399, 400

(56) References Cited

U.S. PATENT DOCUMENTS 4,319,406 * 3/1982 Pehrson, Sr. et al. ................. 33/295

* cited by examiner

Primary Examiner—Robert Kim
Assistant Examiner—Andrew H. Lee
(74) Attorney, Agent, or Firm—Michael S. Yatsko

(57) ABSTRACT

An alignment system for multiple objects, such as gain generator modules for a distributed laser resonator. The present invention allows for banks or rows of objects, such as gain generator modules, to be maintained in alignment with one another under closed loop control. In particular, one module of every bank or row is designated as the reference or master module, for example, at one end of the bank. Each of the remaining modules or objects are designated as slave modules and carried by a positioning module. The positioning modules are used to control the x and y movements of the slave modules relative to the master or reference module under closed loop. An iris or target with an aperture is mounted on each of the slave modules. A laser source mounted on the master or reference module is dithered relative to the targets in the x and y directions. An optical system, for example, simple telescope at the base of each target images the laser onto a detector. An error signal is created by synchronous detection, which, in turn, is applied to the positioning modules to align each of the slave modules relative to the master or reference module by closed loop control without any extra extensive weight penalties on the aircraft platform.

19 Claims, 6 Drawing Sheets

Intercepted power illuminates each aperture.
Aperture diameters are sized to intercept a fixed fraction of transmitted power: 15%, 10% and 5%.

Ratio aperture size to Beam e-folding diameter

Intercepted Power Ratio relative to the first target

MULTIPLE UNIT ALIGNMENT SYSTEM

CROSS-REFERENCE TO RELATED APPLICATIONS

This application is related to commonly owned co-pending application entitled "High Resolution Positioner" by P. Livingston, filed on even date.

BACKGROUND OF THE INVENTION

1. Field of the Invention

The present invention relates to an alignment system and more particularly to an alignment system for multiple objects which includes a plurality of positioning modules for carrying the multiple objects. The positioning modules are controlled as a function of the displacement of each object relative to one of the objects, such that the alignment of all the objects relative to each other is uniform.

2. Description of the Prior Art

Various laser weapons are known in the art. Such laser weapons are known to be mounted on ground based platforms as well as aircraft based platforms.

Because of its size, the gain generator may be formed in modules. The proposed Airborne Laser Demonstrator (ABL) laser consists of 14 gain generator modules, adapted to be arranged in two banks of 7 each. Each module weighs in the neighborhood of about 5,000 pounds. On airborne platforms, the banks of the gain generator modules are adapted to be oriented parallel to the airplane roll axis.

During flight it is known that the aircraft floor upon which the modules are seated sags causing the gain generator modules to fall out of optical alignment with one another. Such misalignment of the gain generator modules is known to cause serious degradation of the performance of the laser weapon. Unfortunately, the alignment of the component parts of such lasers must be relatively precisely maintained.

Conventionally this problem has been addressed by disposing the gain modules on a re-enforced platform or re-enforcing the floor of the aircraft on which the modules are seated. Unfortunately, either solution adds additional weight to the aircraft which is highly undesirable. Thus, there is a need for a system for maintaining the alignment of a plurality of objects, such as gain generator modules, that is relatively light weight and maintains the units in optical alignment both during flight and on the ground.

SUMMARY OF THE INVENTION

Briefly, the present invention relates to an alignment system for multiple objects, such as gain generator modules of a distributed laser. The present invention allows for banks or rows of objects, such as gain generator modules, to be maintained in alignment with one another under closed loop control. In particular, one module of every bank or row is designated as the reference or master module, for example, at one end of the bank. Each of the remaining modules or objects are designated as slave modules and carried by a positioning module. The positioning modules are used to control the x and y movements of the slave modules relative to the master or reference module under closed loop. An iris or target with an aperture is mounted on each of the slave modules. A laser source mounted on the master or reference module is dithered relative to the targets in the x and y directions. An optical system, for example, simple telescope at the base of each target images the laser onto a detector. An error signal is created by synchronous detection, which, in turn, is applied to the positioning modules to align each of the slave modules relative to the master or reference module by closed loop control without any extra extensive weight penalties on the aircraft platform.

DESCRIPTION OF THE DRAWINGS

These and other advantages of the present invention will be readily understood with reference to the following specification and attached drawing wherein.

DETAILED DESCRIPTION

The present invention relates to a multiple unit alignment system. As shown and described herein, the alignment system is shown in an application for aligning a plurality of gain modules which form a portion of a cylindrical resonator laser weapon. However, it should be clear to those of ordinary skill in the art that the principles of the present invention are applicable to virtually any types of objects which must be aligned relative to each other.

Figure 1:
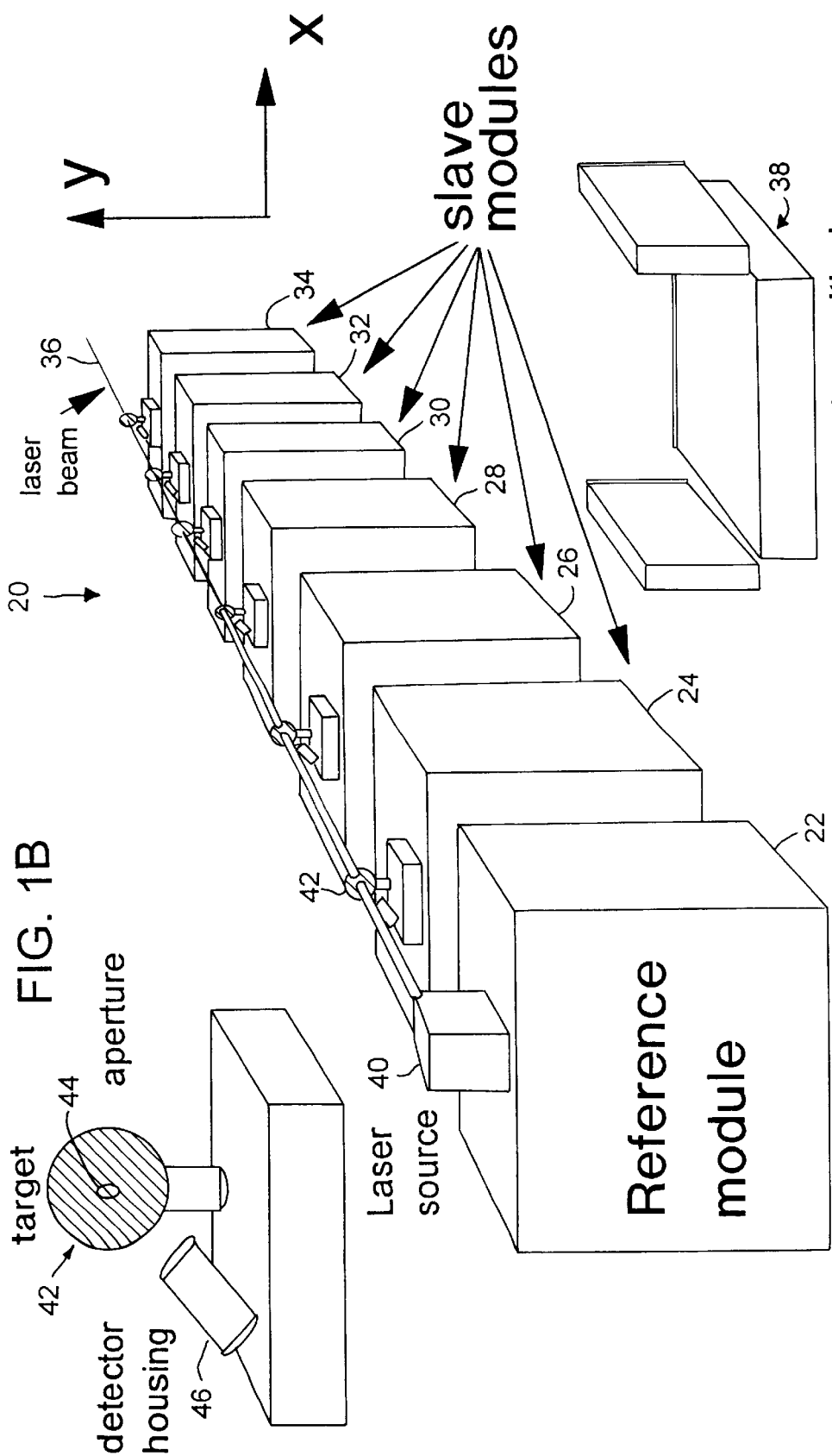
FIG. 1 is a block diagram illustrating the multiple unit alignment system in accordance with the present invention.

Referring to FIG. 1, one or more banks 20 of a plurality, for example, seven (7), gain modules 22, 24, 26, 28, 30, 32 and 34, is adapted to be mounted on an aircraft platform, parallel with the aircraft roll axis. One end module, for example, the module 22, is designated as a reference or master module. The balance of the modules 24, 26, 28, 30, 32 and 34 are designated as the slave modules. As will be discussed in more detail below, the system in accordance with the present invention aligns the slave modules 24, 26, 28, 30, 32 and 34 relative to the reference module 22 in an x-y direction so that the bank 20 acts as a rigid block allowing end benches (not shown) to be aligned to them.

In accordance with an aspect of the invention, each of the slave modules 24–34 is mounted on a positioning module 38. As will be discussed in more detail below, the positioning module 38 is used to provide x and y positioning of each of the slave modules 24–34 under closed loop control. The positioning modules 38 position each of the slave modules 24–34 as a function of the x y displacement of each of the slave modules 24–34 relative to the reference module 22. More particularly, each of the modules 22–34 is aligned to a basic reference line generated by a laser beam 36.

A laser source 40, mounted on the reference or master module 22, is used to generate the laser beam 36 which forms the reference line.

An iris or target 42 with an aperture 44 is mounted on each of the slave modules 24–34. The aperture dimensions are selected to decrease successively with each module proceeding from the first slave module 24 to the last module 34 in order to intercept a fixed percentage of the laser beam 36 passing through it. An optical system, for example, a simple telescope 46, may be mounted at the base of each target 42, a small distance therefrom. The telescope 46 is used to image an illuminated ring surrounding the aperture 44 and the iris 42 arising from the intercepted laser power onto a detector 47 (FIG. 5), for example, a simple silicon detector. As will be discussed in more detail below, the intercepted laser power is synchronously detected and used to generate an error signal which, in turn, is used to drive the positioning module 38 for each of particular slave modules 24–34 as a function of the x-y position of the slave module 24–34 relative to the x-y position of the reference module 22.

In accordance with an important aspect of the invention, the laser beam 36 is dithered in orthogonal directions (i.e. in the x and y directions), traveling perhaps ±30% of its radius. If a target aperture 44 is centered on the beam 36, the detected time varying electrical signal will contain only even harmonics of the sinusoidal dither frequency. However, if the aperture 44 is displaced from the beam centroid as a result of motion of a slave module 24–36, the electrical signal will have a temporal component at the fundamental dither frequency but with a phase that is either in phase with the dither or a 180° out of phase depending on whether the aperture 44 is displaced to the left or the right or up or down. As will be discussed in more detail below, the left and right and up and down motions are distinguishable because dither frequencies in the orthogonal directions are distinct. Thus, a synchronous detector will not be sensitive to the wrong frequencies as long as the dither frequencies are not multiples of one another.

Figure 2:
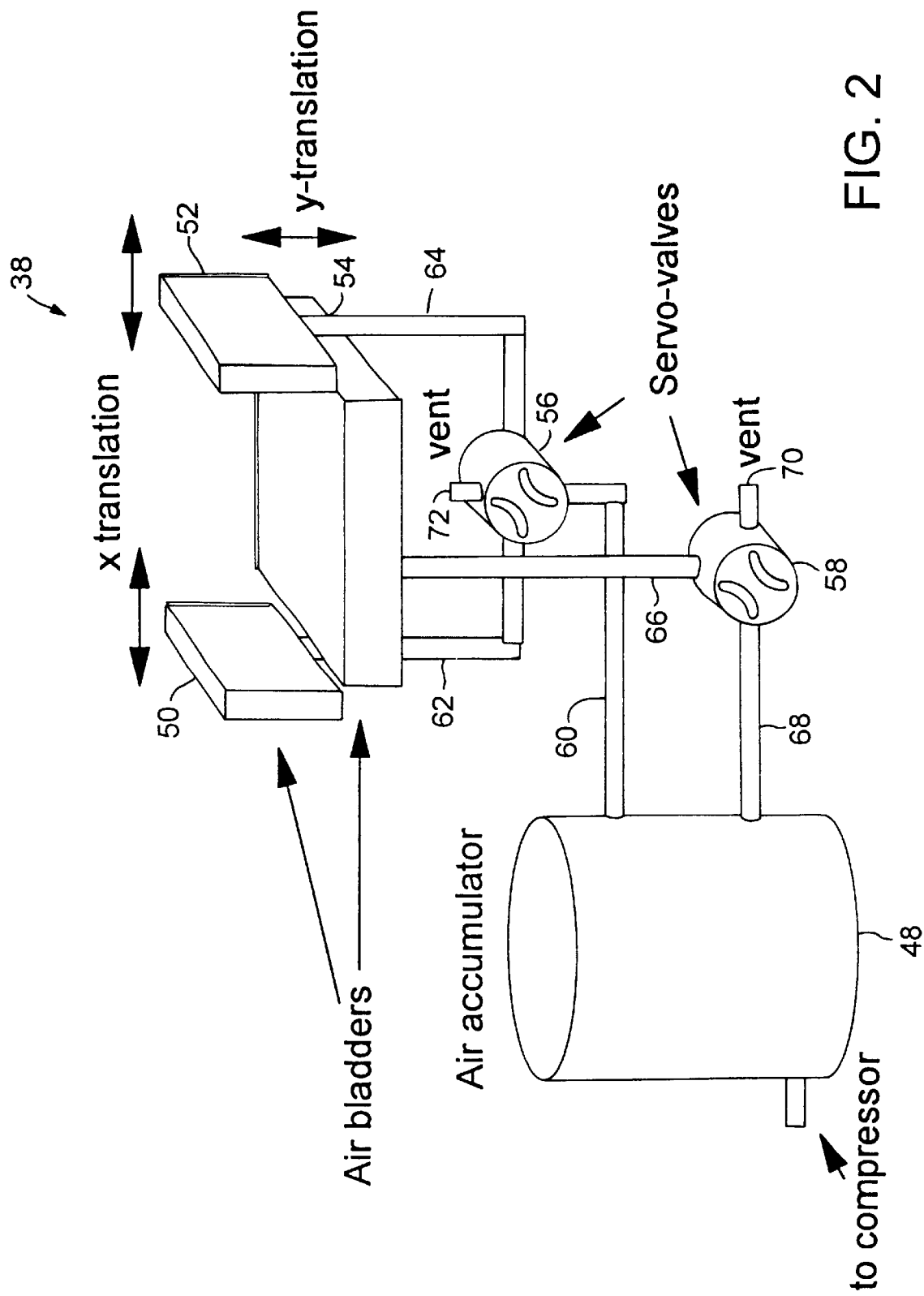
FIG. 2 is a simplified schematic diagram of an exemplary positioning module in accordance with the present invention.

An exemplary positioning module 38 is illustrated in FIG. 2. As shown, the positioning module 38 is shown as a pneumatic system; however, other types of positioning modules, such as hydraulic, electrical and electronic modules are contemplated. As discussed above, one positioning module 38 is provided for each of the slave modules 24–34. The positioning module 38 includes an air accumulator 48 and a plurality of air bladders 50, 52 and 54, connected to the air accumulator 48 by is way of a pair of servo valves 56 and 58. The air bladders 50 and 52 are oriented vertically as shown and control the x translation of the various slave modules 24–34 while the air bladder 54 is horizontally oriented and is used to control the y translation of the reference modules 24–34. The air accumulator 48 for all of the positioning modules 30 may be connected to a common compressor (not shown).

The air bladders 50, 52 and 54 are under the control of the accumulator 48 that is maintained at a roughly constant pressure by the common compressor. The servo valves 56 and 58 operate such that the rate of pressure change in a bladder 50, 52 and 54 is proportional to an error signal, discussed below in order to form a first order system. The servo valve 56 is connected by a suitable air line 60 to the accumulator 48 and to each of the bladders 50 and 52 by a pair of air line 62 and 64. Similarly, the servo valve 58 is connected to the air bladder 54 by an air line 66 and to the accumulator 48 by way of an air line 68. Each of the servo valves 56 and 58 is also connected to a vent port 70 and 72, respectively. The position of the servo valves 56 and 58 either causes air pressure from the air accumulator 48 to be provided to the air bladders 50, 52, 54 or to be vented.

The servo valve 56 operates differentially by reducing the pressure on one bladder 50 while increasing the pressure on the other side. For example as shown in FIG. 2, the servo valve 56 is positioned such that the bladder 50 is being vented while the bladder 52 is increasing in air pressure.

Similarly the servo valve 58 causes air pressure to either be vented or increased relative to the bladder 54 for causing y translation of the reference module 24–34. In the position shown in FIG. 2, the air from the air accumulator 48 as being used to increase the air pressure in the bladder 54.

Figure 3:
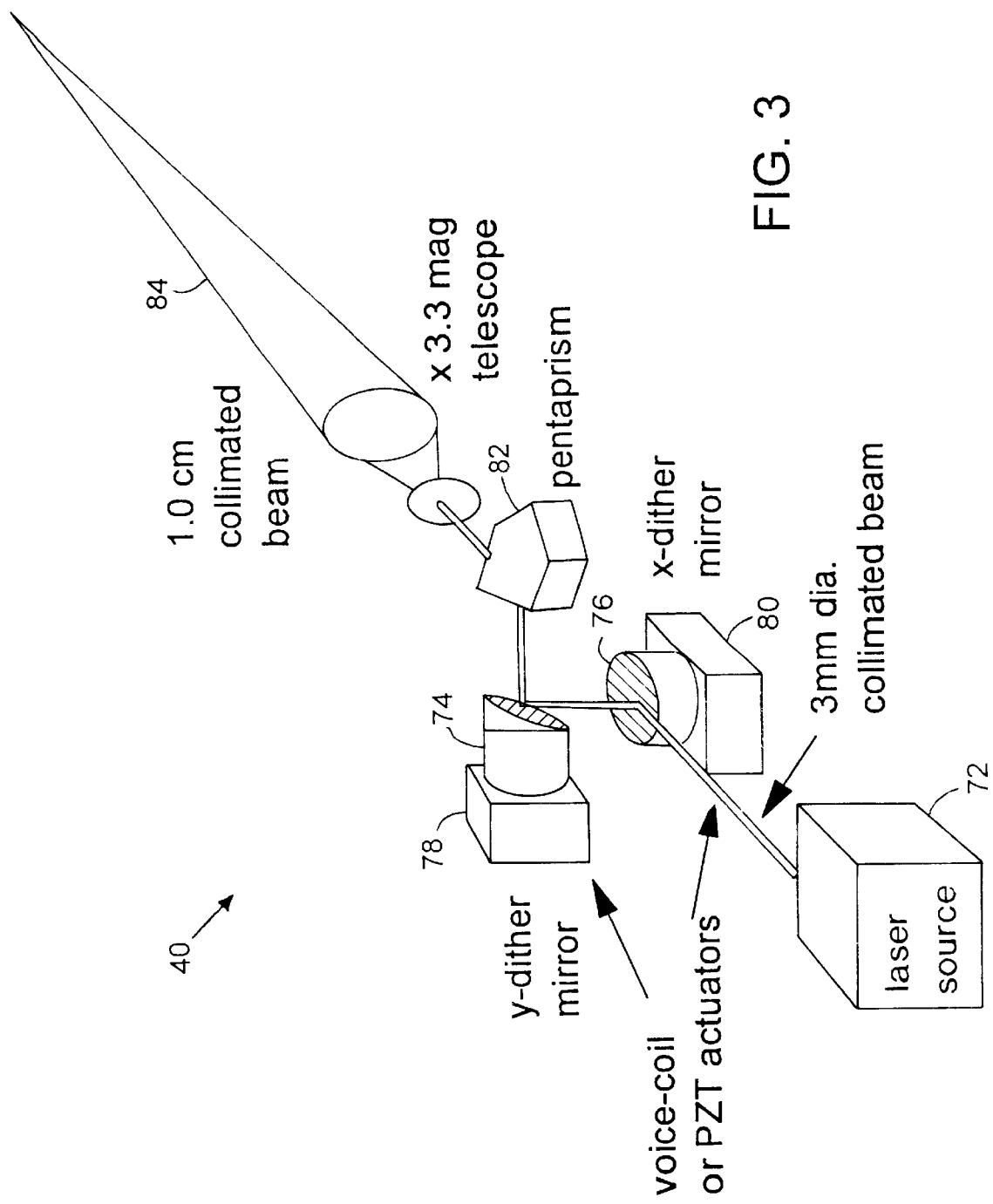
FIG. 3 is a block diagram of a laser source and dither control system for use with the present invention.

The laser source 40 is illustrated in FIG. 3. The laser source 40 includes a small relatively low wattage laser, for example, a HeNe laser or a small solid state laser having a few milliwatts of output power. The laser source 40 also includes a y dither mirror 74 and an x dither mirror 76. The y dither mirror 74 and x dither mirror 76 may be formed as voice coil operated piston mirrors or may be mirrors driven by PZT actuators 78 and 80. The laser source 42 may also include a pentaprism 82 and a telescope 84, for example, a 3.3× magnification telescope to produce a 1.0 cm collimated beam as shown.

The beam is dithered in orthogonal directions by way of the x-dither and y-dither mirrors 80 and 78. Each of the mirrors 78 and 80 may have a maximum excursion or ±0.9 mm if the beams are to be dithered with a 30% beam radius excursion. If greater excursions are needed, additional mirrors can be added to make the reflections from the dither mirrors 78 and 80 an obtuse angle since the ratio of the beam displacement to the piston stroke is the cotangent of the incidence angle. The telescope 84 may be used to expand the beam diameter to 1 cm for the purpose of improving the performance of the last module 34 in the line.

Figure 4A:
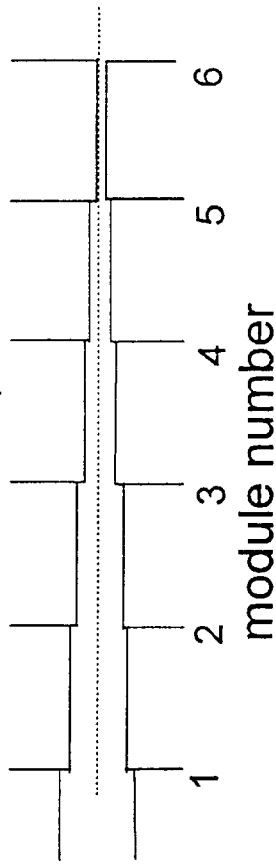
FIGS. 4a, 4b and 4c are exemplary graphical illustrations which illustrate the aperture diameter for the target apertures as a function of the power intercept for the present invention.
Figure 4C:
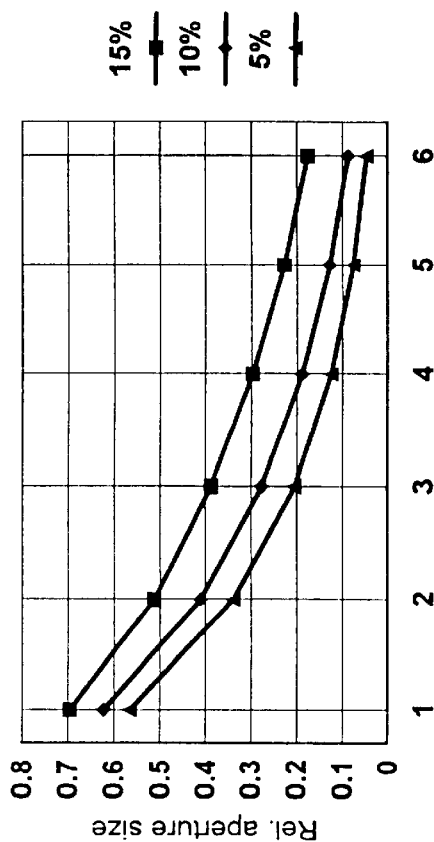
Figure 4B:
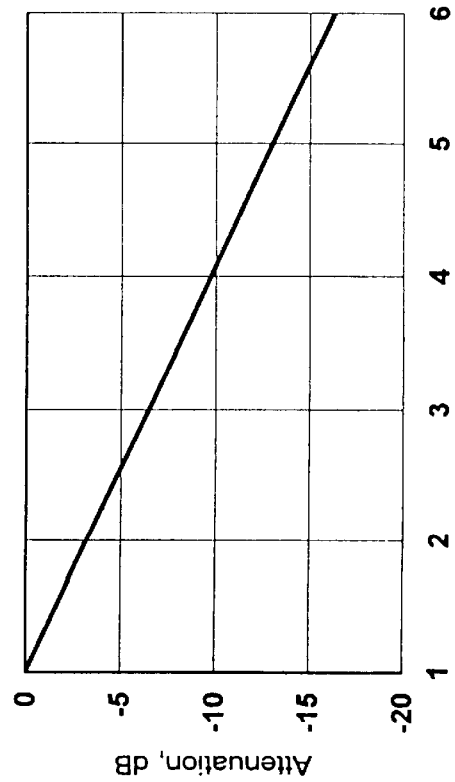

FIGS. 4a–4c illustrate how the reflected power varies with the decreasing aperture sizes to intercept the fixed percentage of the laser beam passing through the target aperture 44. As seen in FIGS. 4a–4c, the aperture diameters are selected relative to the beam e folding diameter. Thus, for a nominal 1 cm diameter launched beam, the first aperture may be 0.709 cm. The three curves shown in FIG. 4c represent 15%, 10% and 5% of the intercepted power. An optimal trade-off between finite hole size for the last target and small initial diameter is to scrape off 10% of the transmitted power. As shown in FIG. 4, even though the power of the last detector is down by 20 dB, the system will still perform satisfactorily.

Figure 5:
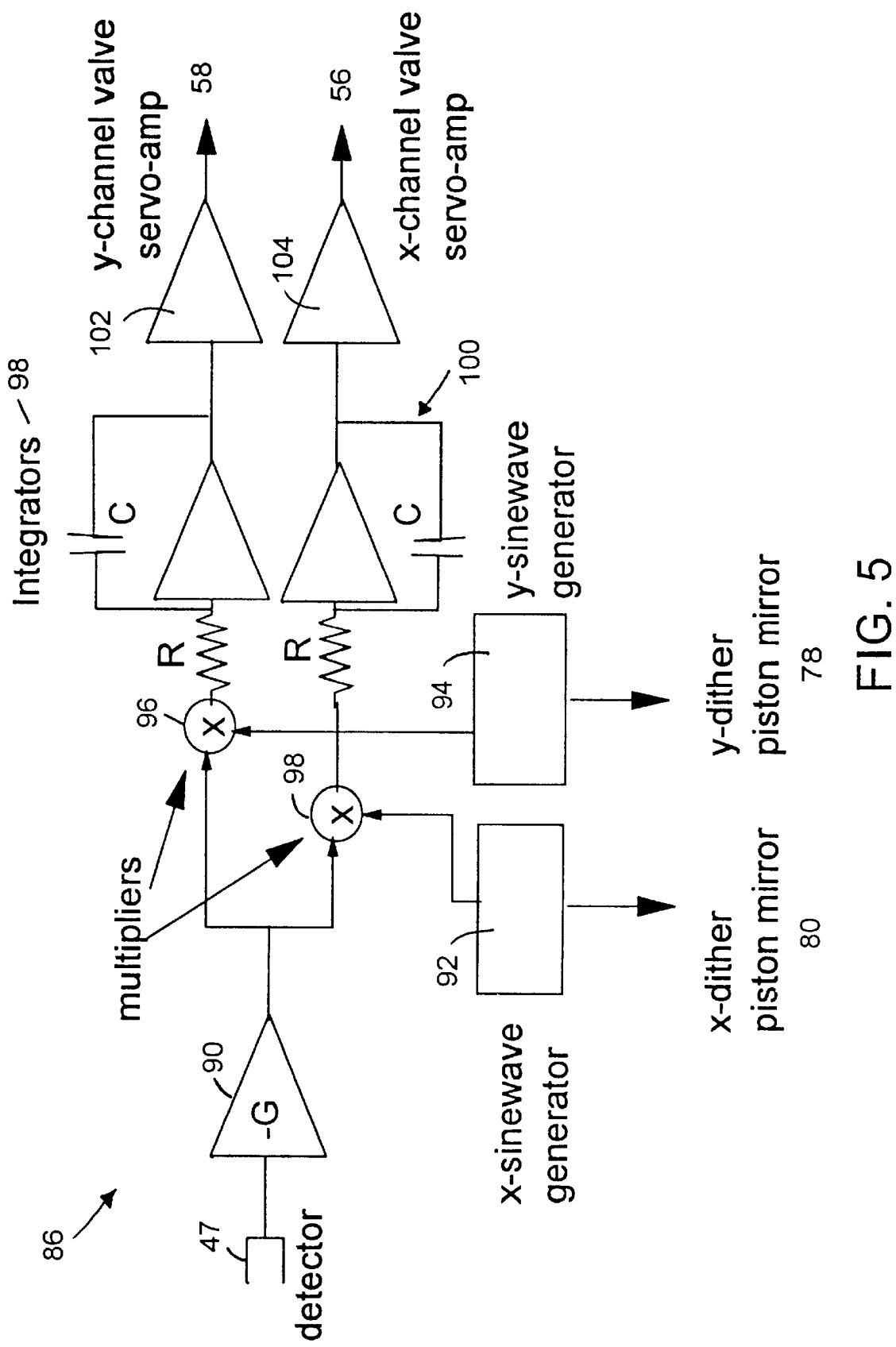
FIG. 5 is a schematic diagram of the control system for a positioning module in accordance with the present invention.
Figure 6A:
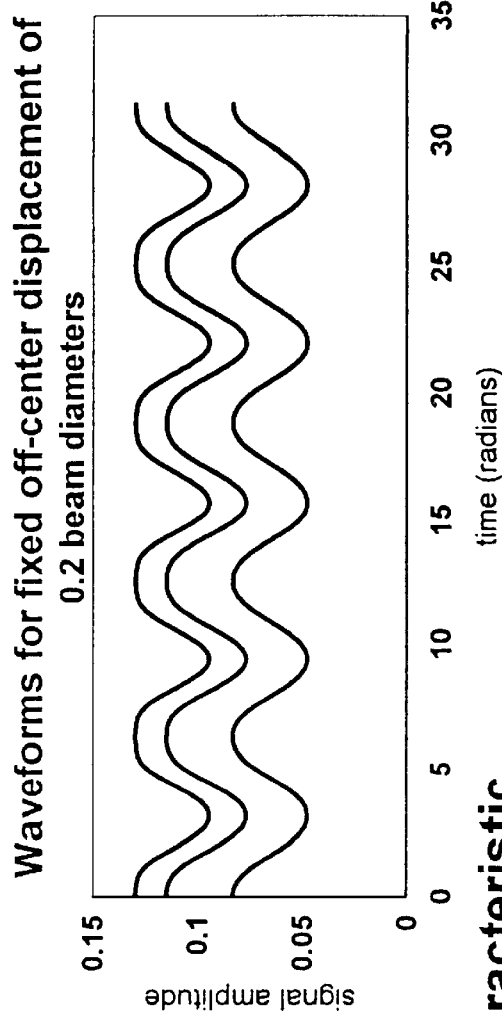
FIG. 6a is a graphical illustration of the input signals to the multipliers illustrated in FIG. 5.
Figure 6B:
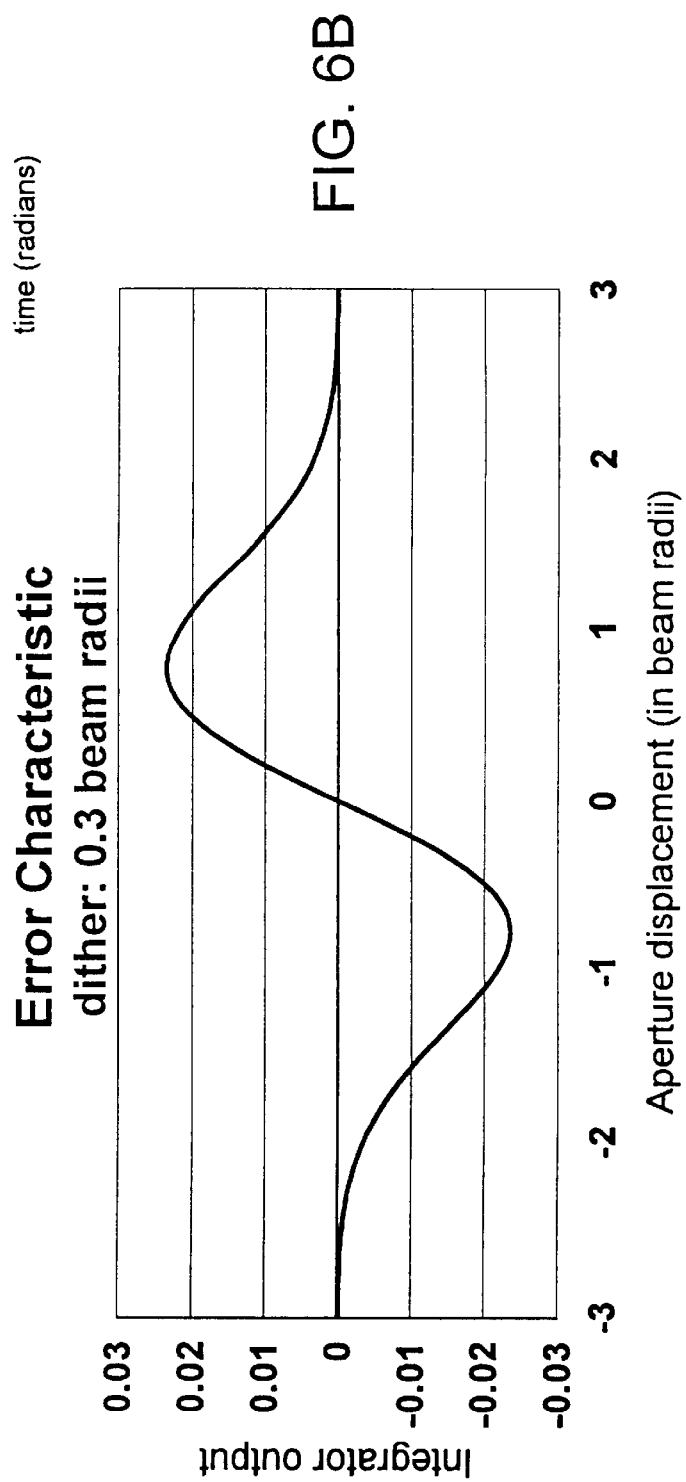
FIG. 6b is a graphical illustration of the error characteristic available at the output of the integrator in FIG. 5.

A control circuit for the servo valves 56 and 58 as well as the x dither position mirror 80 and a y dither position mirror 78 is illustrated in FIG. 5 and generally identified with the reference numeral 86. The control circuit 86 includes the detector 47 mounted at the base of the targets 42 as discussed above. The output of the detector 47 is applied to a gain amplifier 90. Each gain amplifier 90 has a gain G such that the output of the upstream integrator will be the same for the target hole displacement. After the detector signal is amplified, it is multiplied by sinusoid signal from a respective sinewave generators 92 and 94 by way of a pair of multipliers 96 and 98 for synchronous detection and forms a product signal. An exemplary product signal at the output of the multipliers 96 and 98 is illustrated in FIG. 6a at the first target for 15%, 10% and 5% scraped power for a target hole displacement of 0.2 beam diameters. The sinewave generators 92 and 94 are used to control the dither motion of the x dither piston mirror 80 and the y dither piston mirror 78, respectively. The x and y sinewave generators 92 and 94 may be common to all modules thus requiring only 2 generators for all modulators. The product signal is applied to a pair of integrators 98 and 100 for the x and y channels. As shown, the integrators 98 and each include an input resistor R and a feedback capacitor C. The integrator time constant is the product of the resistor R and the capacitance C. The output of the integrators 98 and 100 provide error signals which are applied to servo amplifiers 102 and 104 for each of the servo valves 58 and 56, respectively. An exemplary error signal, available at the output of the integrators 98 and 100, is illustrated in FIG. 6b. In each case, the target hole 44 is shown displaced by 0.2 beam diameters. Although there is a strong fundamental component to the signal, the rounded tops of the waveforms relative to the bottoms indicates the presence of waveform second harmonics. The hole centered on the beam waveform which show small wiggles about subnominal DC level but with half the period of a dither signal. The error characteristic illustrated in FIG. 6b demonstrates a significant capture of about ±2.2 beam radii. For the first target, this amounts to a displacement of about ±1.1 cm. For the last target the number is much less because the beam is small at that point.

A detailed development of the error signal is provided below. In particular, under most circumstances, the far-field spot of a laser beam having a good single $TEM_{00}$ beam profile closely approximates a Gaussian. Assuming an e-folding radius of $r=2\lambda/\pi D$, the total power P at an aperture 44 having a diameter d is provided below.

The displacement of the Gaussian beam from the aperture center has two components; one is a bias $\delta$ that measures the beam displacement from the aperture center in units of beam radius $r_0$ and the other is an AC term with a dither amplitude $\eta$. Let $\theta=\omega t$ represent the dimensionless dither time given the angular frequency $\omega$. Defining $A=\delta-\eta\cos\theta$, the total power passed through an aperture is provided by equation (1):

$$P_t(\theta) = \frac{P}{\pi r_0^2} \int\int_d d^2 \bar{r} e^{-\left(\frac{r}{r_0}+A\right)^2}$$

The exponent is expanded and the coordinates of integration are transformed to polar coordinates. To simplify the Fourier-Bessel expansion, the x and y axis definitions are interchanged. Following the transformation, the exponent is expanded carrying the cosine term in a Fourier series as shown by equation (2):

$$P_t(\theta) = \frac{Pe^{-A^2}}{\pi r_{r0}^2} \int\int_0^{2\pi} d\varphi \int_0^{d/2} r\,dr\, e^{-\frac{r^2}{r_0^2}-2\frac{r}{r_0}A\cos\varphi}$$

$$= 2Pe^{-A^2} \int_0^{d/2r_0} u\,du\, e^{-u^2} I_0\left(2A\frac{r}{r_0}\right)$$

Most of the action is in the exponential and the integral is a scaling factor that is only weakly dependent on A. For A is <<1 (the usual case for a servo system near null) and for a beam comparable to or smaller than the aperture 44, a modified Bessel function can be replaced with unity. By expanding the exponential shown in a product of a Fourier-Bessel expansion equation (3) results:

$$e^{-A^2} = e^{-\delta^2-\frac{\eta^2}{2}} \sum_m I_m\left(-\frac{\eta^2}{2}\right)\cos m2\theta \sum_m I(2\delta\eta)\cos n\theta$$

After carrying out the integration in equation (2) following substitution of equation (1) for the Bessel function and replacing the exponential $A^2$ with equation (3), the total received power is provided by equation (4):

$$P_t(\theta) = Pe^{-\delta^2-\frac{\eta^2}{2}} \sum_m I_m\left(-\frac{\eta^2}{2}\right)\cos m2\theta \sum_m I(2\delta\eta)\cos n\theta\left(1-e^{-\frac{d}{2r_0}}\right)^2$$

where P represents the power collected by the detector

The factor following the product of the sums accounts for the power occluded by the aperture.

A synchronous detection of $P_t$ results in an error characteristic. If $w(\delta)$ represents the error characteristic, then $\omega$ is the average power of a dither cycle and is given by equation (5):

$$W(\delta) = \frac{1}{2\pi}\int_0^{2\pi} d\theta\cos\theta P_t(\theta)$$

$$= P\left(1-e^{-\frac{d^2}{4r_0^2}}\right)e^{-\delta^2-\frac{\eta^2}{2}}\sum_m I_m\left(-\frac{\eta^2}{2}\right)$$

$$\sum_n I_n(2\delta\eta)\int_0^{2\pi} \frac{d\theta}{2\pi}\cos 2m\theta \cos n\theta \cos\theta$$

The integral over the trigonometric functions is resolved using orthogonality of the trigonometric functions over a complete period. Thus, the error characteristics is given by equation (6):

$$W(\delta) = \frac{1}{2\pi}\int_0^{2\pi} d\theta \cos\theta P_t(\theta) P\cdot\left(1-e^{\frac{d^2}{4r_0^2}}\right)$$

$$= e^{-\delta^2-\frac{\eta^2}{2}} \sum_{n=1,3,5,\ldots} I_n(2\delta\eta)\left\{\frac{1}{4}I_{\frac{n+1}{2}}\left(-\frac{\eta^2}{2}\right)+\frac{1}{4}I_{\frac{n-1}{2}}\left(-\frac{\eta^2}{2}\right)\right\}$$

As mentioned above, a deviation from the beam centroid is $\delta$ measured in $r_0$ units. Since the modified Bessel function proceeding the brackets is an odd function of its argument, $\omega$ goes through zero and $\delta=0$ and retains the sign ± of the deviation which allows the system to work with very high precision limited only by the dither mirror resolution. The exponential containing $\delta$ rolls off the curve for large values of $\delta$ forming a classical sigmoidal curve.

Obviously, many modifications and variations of the present invention are possible in light of the above teachings. Thus, it is to be understood that, within the scope of the appended claims, the invention may be practiced otherwise than as specifically described above. follows:

What is claimed is:

1. An alignment system for aligning multiple objects defining a reference object and one or more slave objects comprising:

one or more positioning modules for carrying each of said one or more slave objects and positioning said slave objects relative to said reference object;

an optical system for measuring the misalignment of said one or more slave objects relative to a reference line a closed loop control system for generating a control signal for controlling close loop control said one or more positioning models as a function of the misalignment of said one or more slave objects relative to said reference line.

2. The alignment system as recited in claim 1, wherein said reference line is formed by a laser beam.

3. The alignment system as recited in claim 2, wherein said measuring means includes a target with an aperture formed on each of said slave objects and said reference module includes a laser source for forming a reference line relative to said apertures and said laser beam.

4. The alignment system as recited in claim 3, wherein said one or more positioning modules are adapted to vary the position of said slave objects relative to a first axis.

5. The alignment system as recited in claim 4, wherein said one or more positioning modules are additionally adapted to vary the position of said slave objects along a second axis.

6. The alignment system as recited in claim 5, wherein said second axis is generally orthogonal to said first axis.

7. The alignment system as recited in claim 6, wherein said laser beam is dithered along said first and second axes.

8. The alignment system as recited in claim 7, wherein said measuring means includes means for generating an error signal as a function of the displacement of said slave object relative to said reference object.

9. The alignment system as recited in claim 7, wherein said measuring means includes a closed loop control system.

10. A system for measuring the misalignment of one or more objects relative to a reference object, the system comprising:
   a laser source for generating a laser beam mounted on said reference object for forming a reference line;
   a target mounted on each of said objects, said target including a predetermined aperture; and
   means including a pair of sinewave generators for dithering said laser beam along two orthogonal axis;
   an optical system including a detector for imaging the laser beam relative to said aperture; and
   means for generating displacement signal as a function of the displacement of the beam relative to said aperture.

11. The system as recited in claim 10, wherein said dithering means includes a pair of dither mirrors.

12. The system as recited in claim 10, wherein said generating means includes one or more multipliers for multiplying said displacement signals by said sinewave signals defining product signals.

13. The system as recited in claim 12, further including a pair of integrators for integrating said product signals and defining an error signal.

14. The system as recited in claim 13, further including one or more positioning modules for carrying said slave objects as a function of said error signals.

15. The system as recited in claim 14, wherein said positioning modules are pneumatically controlled.

16. The system as recited in claim 15, wherein said positioning modules include one or more our bladders for positioning said slave objects in one or more directions.

17. The system as recited in claim 16, further including one or more servo valves for controlling the air pressure in said one or more air bladders said servo valves under the control of said error signals.

18. The system as recited in claim 17, wherein said system includes two vertically oriented air bladders adapted to be displaced adjacent opposing ends of said slave objects to position said slave object along an x-axis.

19. The system as recited in claim 17, wherein said system includes a horizontally oriented air bladder adapted to be disposed under each of said slave objects to position said object along a y-axis.

* * * * *